US011404858B2

(12) United States Patent
Norris

(10) Patent No.: US 11,404,858 B2
(45) Date of Patent: Aug. 2, 2022

(54) QUICK CONNECT MOUNT FOR ELECTRICAL FIXTURE AND METHOD FOR CONNECTING A CEILING MOUNTED FIXTURE TO AN ELECTRICAL JUNCTION BOX

(71) Applicant: Scott Norris, Owensboro, KY (US)

(72) Inventor: Scott Norris, Owensboro, KY (US)

(*) Notice: Subject to any disclaimer, the term of this patent is extended or adjusted under 35 U.S.C. 154(b) by 265 days.

(21) Appl. No.: 16/668,108

(22) Filed: Oct. 30, 2019

(65) Prior Publication Data

US 2020/0136361 A1 Apr. 30, 2020

Related U.S. Application Data

(60) Provisional application No. 62/752,617, filed on Oct. 30, 2018.

(51) Int. Cl.
*H02G 3/08* (2006.01)
*H02G 3/16* (2006.01)
*H01R 33/76* (2006.01)
*H01R 43/26* (2006.01)
*F21V 23/00* (2015.01)
*F21S 8/04* (2006.01)

(52) U.S. Cl.
CPC ............ *H02G 3/081* (2013.01); *F21V 23/002* (2013.01); *H01R 33/7664* (2013.01); *H01R 43/26* (2013.01); *H02G 3/16* (2013.01); *F21S 8/04* (2013.01)

(58) Field of Classification Search
None
See application file for complete search history.

(56) References Cited

U.S. PATENT DOCUMENTS

| 4,103,983 A | 8/1978 | Morrison et al. |
| 4,645,286 A | 2/1987 | Isban et al. |
| 4,645,289 A | 2/1987 | Isban |
| 4,721,480 A * | 1/1988 | Yung ............ H01R 13/70 416/5 |
| 4,918,258 A | 4/1990 | Ayer |

(Continued)

FOREIGN PATENT DOCUMENTS

| CN | 107062081 A | * | 8/2017 |
| CN | 108695793 A | * | 10/2018 |

(Continued)

*Primary Examiner* — Timothy J. Dole
*Assistant Examiner* — Muhammed Azam
(74) *Attorney, Agent, or Firm* — Martin IP Law Group; C. Richard Martin

(57) ABSTRACT

A quick-connect electrical fixture mounting device having first and second junction box mounting plates is provided. The first junction box mounting plate is removably affixed to the junction box, and a first electrical connector is positioned in a channel in a front face of the first junction box mounting plate. The second fixture mounting plate is removably affixed to the electrical fixture, and a second electrical connector is positioned in a slot in a projection extending upwardly from a front face of the second fixture mounting plate. The channel in the front face of the first junction box mounting plate is sized to slidably receive the projection extending from the front face of the second electrical fixture mounting plate, and the first electrical connector is configured to mate with the second electrical connector.

7 Claims, 6 Drawing Sheets

(56) References Cited

U.S. PATENT DOCUMENTS

| | | | |
|---|---|---|---|
| 4,929,187 A | 5/1990 | Hudson et al. | |
| 6,146,191 A * | 11/2000 | Kerr, Jr | H02G 3/123 |
| | | | 439/537 |
| 6,312,146 B1 * | 11/2001 | Tognacci | F21V 17/164 |
| | | | 248/324 |
| 6,322,232 B1 * | 11/2001 | Oliver | F21S 8/04 |
| | | | 362/147 |
| 6,503,099 B2 * | 1/2003 | Kerr, Jr. | F21V 21/02 |
| | | | 439/537 |
| 6,634,901 B2 * | 10/2003 | Kerr, Jr. | F21V 21/02 |
| | | | 439/332 |
| 6,676,442 B2 * | 1/2004 | Kerr, Jr. | H02G 3/20 |
| | | | 362/147 |
| 6,780,049 B1 * | 8/2004 | D'Angelo | F04D 29/601 |
| | | | 439/313 |
| 6,799,982 B2 * | 10/2004 | Kerr, Jr. | F21V 23/06 |
| | | | 439/180 |
| 6,939,179 B1 | 9/2005 | Kieffer, Jr. et al. | |
| 6,997,740 B2 * | 2/2006 | Kerr | F04D 25/088 |
| | | | 439/537 |
| 7,064,269 B2 | 6/2006 | Smith | |
| 7,467,888 B2 | 12/2008 | Fiene | |
| 7,683,257 B1 | 3/2010 | Shotey et al. | |
| 7,976,338 B1 * | 7/2011 | Webster | H02G 3/081 |
| | | | 439/537 |
| 8,025,528 B2 * | 9/2011 | Smith | F16M 11/041 |
| | | | 439/537 |
| 8,348,220 B2 | 1/2013 | Carter | |
| 8,376,777 B2 | 2/2013 | Smith | |
| 8,523,378 B2 * | 9/2013 | Schulzman | F04D 25/088 |
| | | | 362/147 |
| 9,065,264 B2 * | 6/2015 | Cooper | H02G 3/20 |
| 9,318,886 B1 * | 4/2016 | Pate | F21V 21/02 |
| 9,394,919 B1 * | 7/2016 | Byrne | F04D 29/646 |
| 10,215,347 B2 * | 2/2019 | Stauner | F21V 3/00 |
| 10,520,177 B2 * | 12/2019 | Bailey | F21V 17/02 |
| 10,619,643 B2 * | 4/2020 | Tang | F04D 29/64 |
| 11,092,298 B2 * | 8/2021 | Barak | F21S 8/063 |
| 11,129,276 B2 * | 9/2021 | Iedema | F21V 19/04 |
| 2002/0197910 A1 * | 12/2002 | Kerr, Jr. | H02G 3/20 |
| | | | 439/537 |
| 2003/0148649 A1 * | 8/2003 | Kerr, Jr. | H02G 3/20 |
| | | | 439/332 |
| 2008/0153334 A1 | 6/2008 | Vickers | |
| 2016/0281966 A1 * | 9/2016 | Meyer | F21V 19/0025 |
| 2016/0312987 A1 * | 10/2016 | Danesh | F21V 21/14 |
| 2019/0059142 A1 * | 2/2019 | Chen | F21V 23/0471 |
| 2020/0136361 A1 * | 4/2020 | Norris | H02G 3/20 |

FOREIGN PATENT DOCUMENTS

| | | | | |
|---|---|---|---|---|
| CN | 109099358 A | * | 12/2018 | |
| CN | 110635442 A | * | 12/2019 | |
| CN | 111129866 A | * | 5/2020 | |
| DE | 3414321 C2 | * | 10/1989 | H01R 13/629 |
| KR | 20180011988 A | * | 2/2018 | |
| WO | WO-9517776 A1 | * | 6/1995 | H02G 3/081 |
| WO | WO-0107316 A1 | * | 2/2001 | F04D 29/601 |

* cited by examiner

QUICK CONNECT MOUNT FOR ELECTRICAL FIXTURE AND METHOD FOR CONNECTING A CEILING MOUNTED FIXTURE TO AN ELECTRICAL JUNCTION BOX

BACKGROUND OF THE INVENTION

Field of the Invention

The present invention relates to devices and methods for quickly and easily connecting electrical fixtures. More specifically, the present invention relates to a device and method for quickly and easily connecting overhead electrical fixtures such as lights or ceiling fans to a ceiling electrical box.

Description of the Related Art

Attaching electrical ceiling fixtures, such as lights or fans, to an electrical junction box set into the ceiling is a difficult task for a single installer. To install the fixture, it is lifted to just below the electrical junction box, and is held there while connecting the fixture wires to the electrical supply wires. After the electrical connection is finished, the fixture is lifted further to align mounting holes in the fixture's mounting plate with mounting holes in the junction box. Screws or bolts are then threaded through the mounting holes to secure the fixture to the junction box. The combined operation takes several minutes and usually requires two persons, one to lift and hold the fixture and the other to make the wire and screw connections.

U.S. Pat. No. 6,503,099 teaches a quick connect device for hanging fans, lighting fixtures, and the like. A horizontal sliding connector is provided between the ceiling box and the electrical fixture. The sliding connector takes the weight of the fixture as it is inserted, which can be done by one person. The electrical connections are established by a plug-and-receptacle connector positioned to engage automatically as the sliding connector slides into place.

However, the quick connect device of U.S. Pat. No. 6,503,099 does not include mechanisms for connecting the plates of the mounting device directly to the pre-set mounting holes in the ceiling box and fixture. Accordingly, there is a need for a quick connect mount for an electrical fixture that can be directly mounted to the pre-set mounting holes in the junction box and fixture. There is also a need for a method for connecting a ceiling mounted fixture directly to a ceiling junction box by way of the pre-set mounting holes provided in both the junction box and fixture.

SUMMARY OF THE INVENTION

It is therefore an object of the present invention to provide a quick connect mount for an electrical fixture that can be directly mounted to pre-set mounting holes in the junction box and the fixture.

It is also an object of the invention to provide a method for hanging an overhead electrical fixture directly to a ceiling junction box by way of a quick connect mount that is directly connected to both the junction box and the fixture.

The present invention meets these objects by providing a quick connect mount for an electrical fixture that includes a first mounting plate having mounting holes that align with the mounting holes of the electrical junction box and a second mounting plate having mounting holes that align with the mounting holes of the fixture. The first and second mounting plates are configured to slidably engage one another and mating plugs are provided, one in each that are electrically coupled to one another when the plates are slid into full engagement.

According to one presently preferred embodiment of the invention, there is provided a quick-connect mounting device for an mounting an electrical fixture to a junction box comprising a first junction box mounting plate and a second electrical fixture mounting plate. The first junction box mounting plate includes junction box mounting means for removably affixing the first junction box mounting plate to the junction box, and a first electrical connector positioned in a channel in a front face of the first junction box mounting plate. The second fixture mounting plate includes electrical fixture mounting means for removably affixing the second electrical fixture mounting plate to the electrical fixture, and a second electrical connector positioned in a slot in a projection extending upwardly from a front face of the second fixture mounting plate. The channel in the front face of the first junction box mounting plate is sized to slidably receive the projection extending from the front face of the second electrical fixture mounting plate, and the first electrical connector is configured to mate with the second electrical connector.

The means for removably affixing the first junction box mounting plate to the junction box may comprise a plurality of bore holes located at opposing corners of the junction box mounting plate and a plurality of bolts inserted through the bore holes and threadabtly engaging threaded bore holes in the junction box. Similarly, the means for removably affixing the second electrical fixture mounting plate to the electrical fixture comprises a plurality of bore holes located at opposing corners of the electrical fixture mounting plate and a plurality of bolts inserted through the bore holes and threadabtly engaging threaded bore holes in the electrical fixture.

The quick-connect mounting device may further include a plurality of electrical wires passing through an opening in the first junction box mounting plate and having first ends connected to the first electrical connector and second ends coupled to power supply wires within the junction box. The quick-connect mounting device may also include a plurality of electrical wires passing through an opening in the second electrical device mounting plate and having first ends connected to the second electrical connector and second ends coupled to electrical terminals of the electrical fixture.

According to a further aspect of the invention, side walls of the channel in the front face of the first junction box mounting plate are angled inwardly to receive outwardly sloping walls of the mating projection on the second electrical fixture mounting plate. The first electrical connector may be a female connector and the second electrical connector may be a male connector with male contacts configured to engage the female contacts of the first electrical connector when the first junction box mounting plate and second electrical device mounting plate are fully engaged.

The junction box may be mounted in a ceiling of a structure according to a further aspect of the present invention.

According to another aspect of the present invention, there is provided a method for providing a removable quick-connect between a junction box and an electrical device. A first junction box mounting plate is removably affixed to the junction box and a second electrical fixture mounting plate is removably affixed to an electrical fixture. A channel in a front face of said first junction box mounting plate is aligned with a projection extending upwardly from a front face of the second electrical fixture mounting plate.

The channel in the front face of the first junction box mounting plate is sized to slidably receive the projection extending from the front face of the second electrical fixture mounting plate. The projection extending from the front face of the second electrical fixture mounting plate is then slid into the channel of the first junction box mounting plate until a first electrical connector positioned in the channel in the front face of said first junction box mounting plate engages a second electrical connector positioned in a slot in the projection extending upwardly from the front face of the second fixture mounting plate.

The step of removably affixing the first junction box mounting plate to the junction box further comprises the steps of: aligning a plurality of bore holes located at opposing corners of the junction box mounting plate with threaded bore holes in the junction box; inserting a plurality of bolts through said corresponding plurality of bore holes and threadabtly engaging the corresponding plurality of threaded bore holes in the junction box. The step of removably affixing the second electrical fixture mounting plate to the electrical fixture further comprises the steps of: aligning a plurality of bore holes located at opposing corners of the electrical device mounting plate with threaded bore holes in the electrical device; and inserting a plurality of bolts through the corresponding plurality of bore holes and threadabtly engaging the corresponding plurality of threaded bore holes in the electrical device.

The method for providing a removable quick-connect may further comprise the step of connecting second ends of a plurality of wires passing through an opening in the first junction box mounting plate and having first ends connected to the first electrical connector to power supply wires within the junction box. Similarly, the method for providing a removable quick-connect may further comprise the step of connecting second ends of a plurality of wires passing through an opening in the second electrical device mounting plate and having first ends connected to the second electrical connector to electrical terminals of the electrical fixture.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

DETAILED DESCRIPTION OF THE INVENTION

Figure 1:
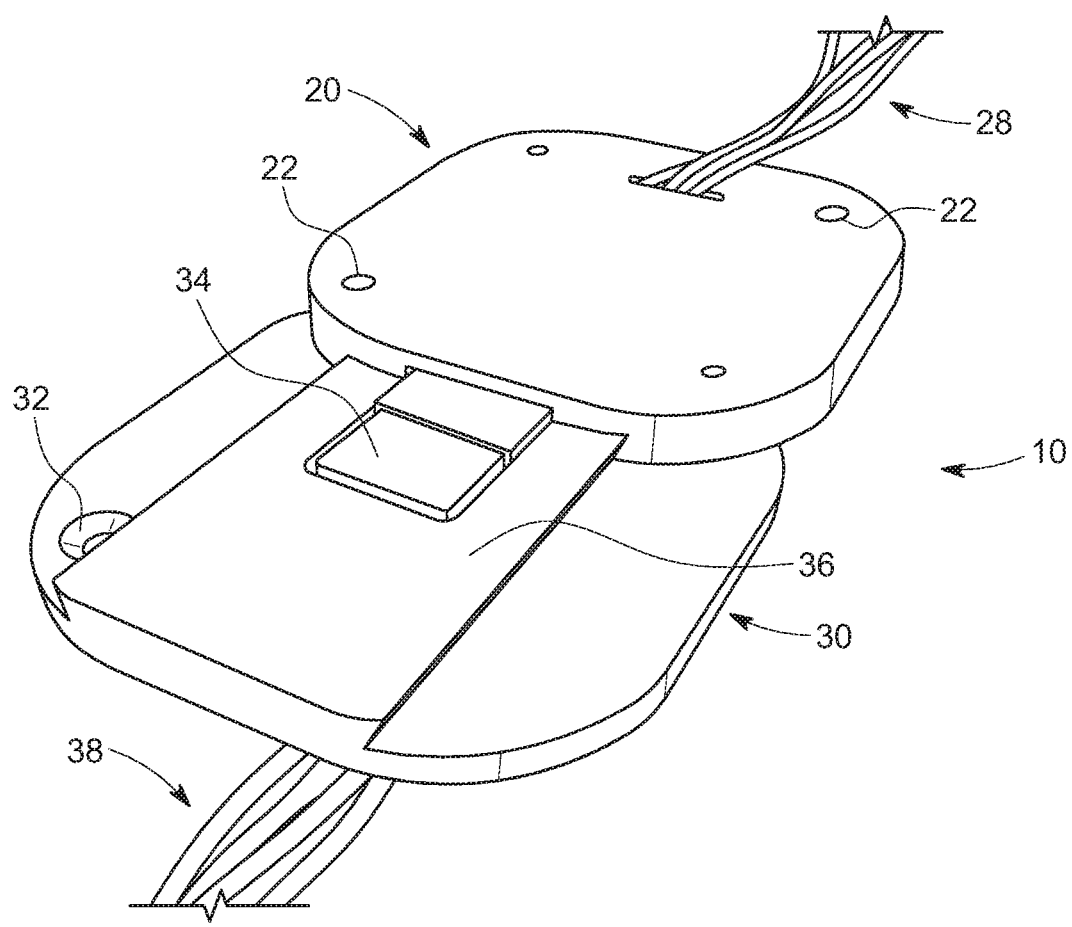
FIG. 1 is a perspective view of a quick connect for an electrical fixture according to a presently preferred embodiment of the invention.
Figure 2:
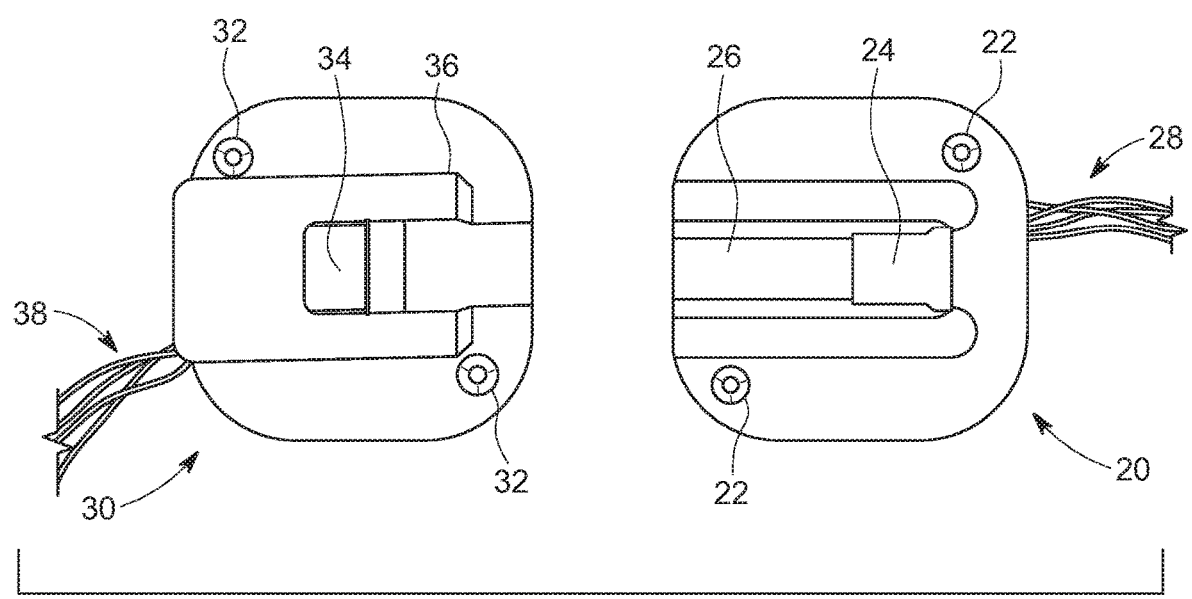
FIG. 2 is a plan view of the mating faces of the two plates of the quick connect for an electrical fixture shown in FIG. 1.

For purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in FIG. 1-FIG. 5, one presently preferred embodiment of the invention comprises a quick connect mounting assembly 10 which includes a first junction box mounting plate 20 and a second fixture mounting plate 30. It is within the scope of the invention to flip the plates such that the first mounting plate 20 is connected to the fixture 50 and the second mounting plate 30 is connected to the junction box 40, but for purposes of the detailed description, the first mounting plate 20 will be described as being connected to the junction box 40 and the second mounting plate will be described as being attached to the fixture 50.

The first mounting plate 20 has a plurality of bore holes 22 at opposing corners thereof that line up with and correspond to threaded bores 42 located in opposing corners of a standard ceiling electrical junction box 40. Bolts or screws 23 are inserted through holes 22 and engage the threads of the threaded bore holes 42 to secure the first mounting plate 20 to the ceiling junction box 40. Similarly, the second mounting plate 30 has a plurality of bore holes 32 at opposing corners thereof that line up with and correspond to threaded bores 52 located in opposing corners of a standard electrical fixture 50 such as the light fixture shown in FIG. 4A, FIG. 4B and FIG. 5. Bolts or screws 33 are inserted through holes 32 and engage the threads of the threaded bore holes 52 to secure the second mounting plate 30 to the fixture 50.

Figure 3A:
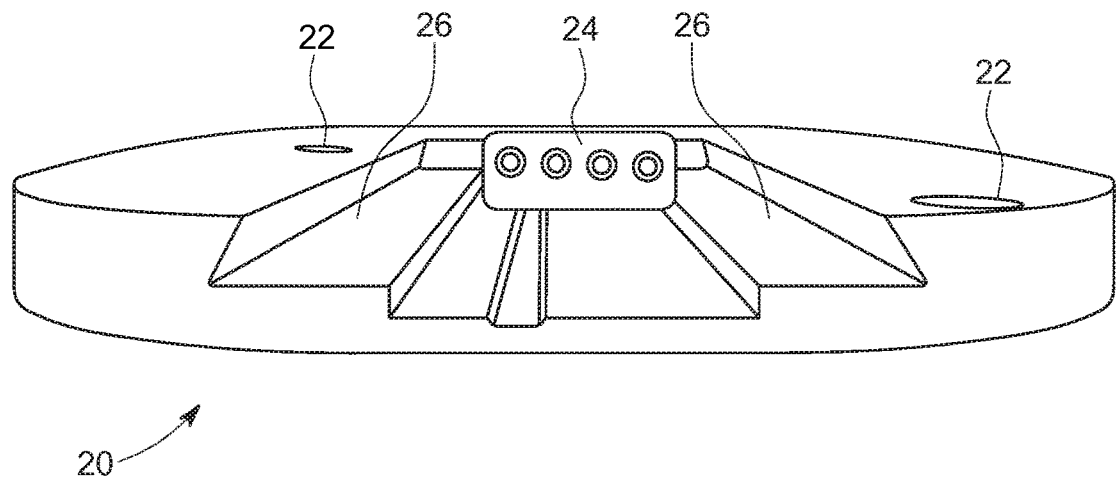
FIG. 3A is an end view of the junction box mounting plate of the quick connect for an electrical fixture shown in FIG. 1.
Figure 3B:
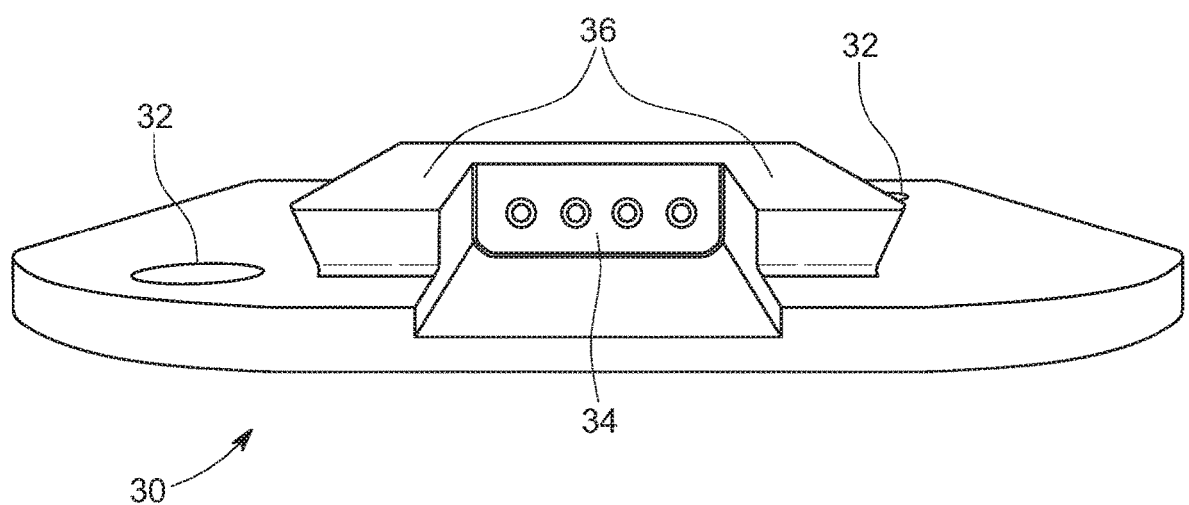
FIG. 3B is an end view of the fixture mounting plate of the quick connect for an electrical fixture shown in FIG. 1.
Figure 4A:
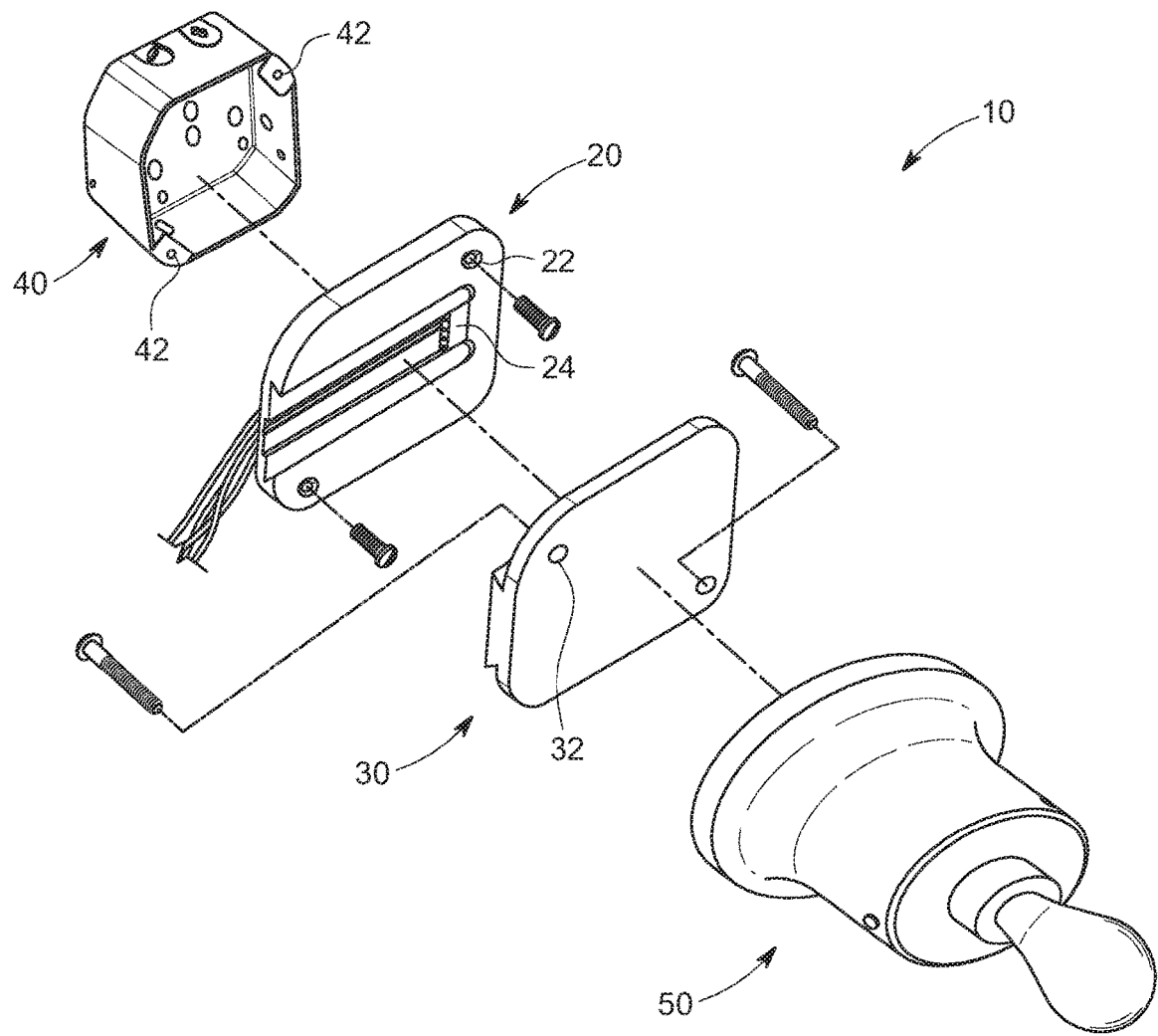
FIG. 4A is a front exploded perspective view of the quick connect for an electrical fixture shown in FIG. 1, shown in combination with a ceiling electrical junction box and light fixture.
Figure 4B:
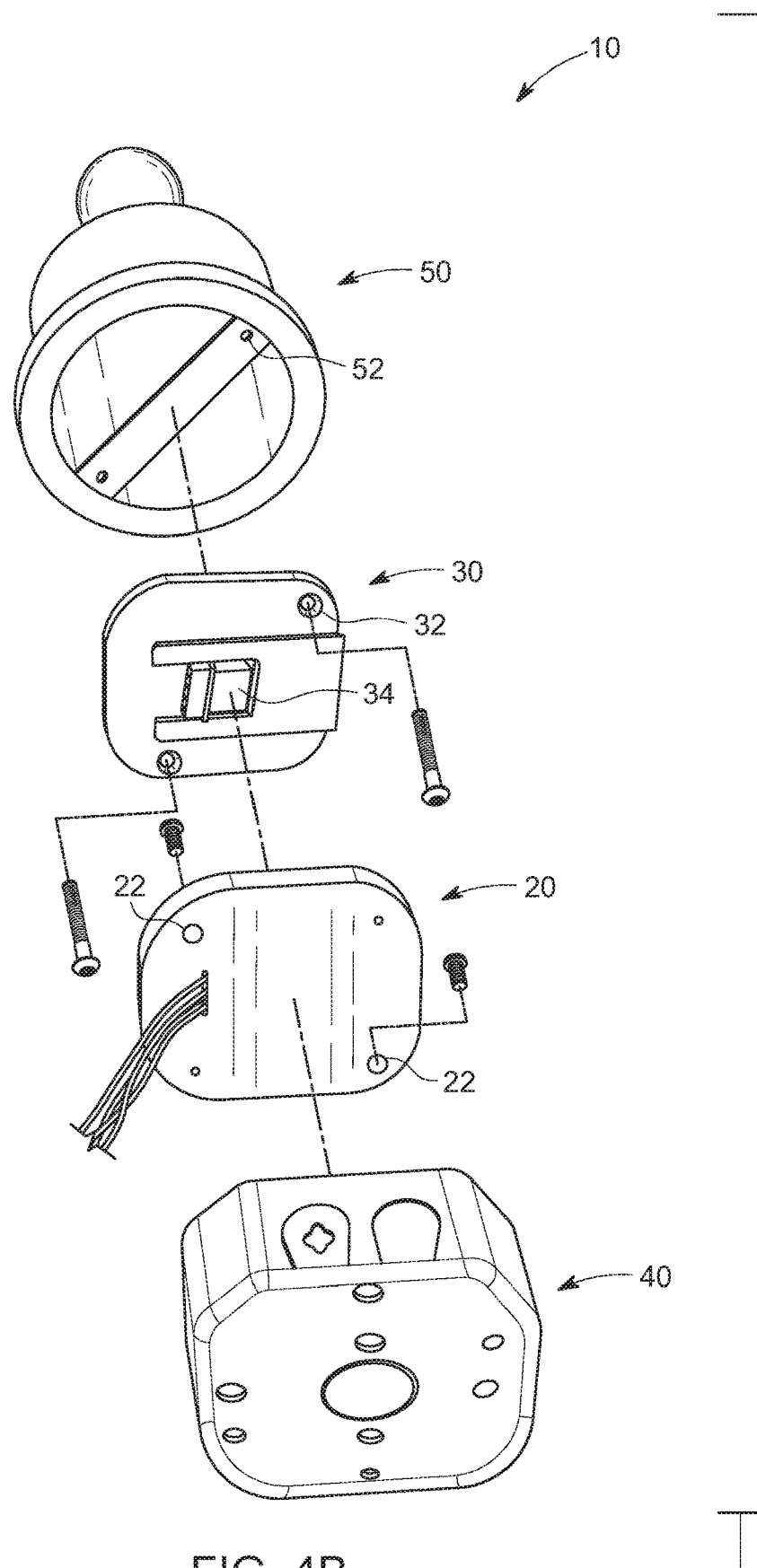
FIG. 4B is a rear exploded perspective view of the quick connect for an electrical fixture shown in FIG. 1, shown in combination with a ceiling electrical junction box and light fixture.
Figure 5:
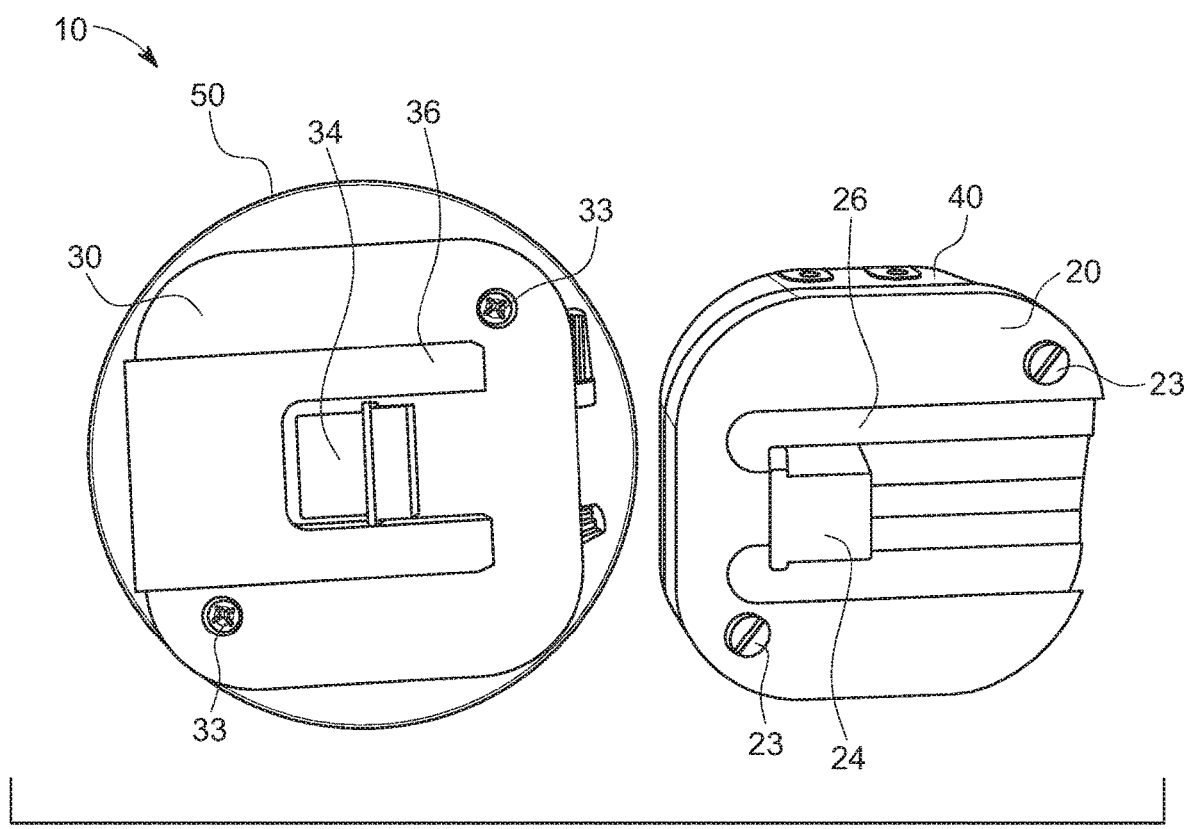
FIG. 5 is a plan view of the mating faces of the two plates of the quick connect for an electrical fixture shown in FIG. 1 shown mounted on the junction box and fixture.

A first electrical connector 24 is positioned in a channel 26 in the face of the first mounting plate 20. Electrical wires 28 have first ends connected to the first electrical connector 24 and second ends that pass through an opening in the first mounting plate 20 and travel to the interior of the junction box 40 where they are electrically coupled to the power supply in a conventional manner. As best shown in FIG. 3A, the side walls of the channel 26 are angled inwardly to receive the outwardly sloping walls of the mating projection 36 on the second mounting plate 30 (FIG. 3B). The second mounting plate 30 also includes a second electrical connector 34. Electrical wires 38 have first ends connected to the second electrical connector 34 and second ends that pass through an opening in the second mounting plate 30 for electrical coupling to the terminals of the fixture 50. As shown in FIG. 3A and FIG. 3B, the first electrical connector 24 is a female connector and the second electrical connector 34 is a male connector with male contacts configured to engage the female contacts of the first electrical connector 24 when the first mounting plate 20 and second mounting plate 30 are fully engaged.

In operation, the mounting plates 20, 30 are first attached to the junction box 40, and fixture 50, respectively. The wires 28 of the first mounting plate 20 are connected to the power source wires inside the ceiling junction box 40. The first mounting plate 20 is then attached to the junction box 40 by bolts or screws 23 that pass through the openings 22 in the first mounting plate 20 and threadably engage the threaded openings 42 in the junction box 40. The wires 38 of the second mounting plate 30 are connected to the terminals on the fixture 50. The second mounting plate 30 is then attached to the fixture 50 by bolts or screws 33 that pass through the openings 32 in the second mounting plate 30 and threadably engage the threaded openings 52 in the fixture 50.

Once both of the mounting plates 20, 30 are secured, the open end of the channel 26 of the first mounting plate 20 is lined up with the free end of the mating projection 36 of the second mounting plate 30. The second mounting plate 30 and the fixture 50 that is affixed thereto are then slid along the axis of the channel 26 until the electrical contacts of the first electrical connector 24 fully engage the electrical contacts of the second electrical connector 34. When this occurs, the first mounting plate 20 should be substantially in alignment with the second mounting plate 30. The fixture 50 may be removed by sliding the fixture 50 and associated second mounting plate 30 in the opposite direction until the walls of the projection 36 are clear of the walls of the channel 26.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

I claim:

1. A quick-connect mounting device for mounting an electrical fixture to a junction box comprising:
    a first junction box mounting plate having junction box mounting means for removably affixing said first junction box mounting plate to said junction box, and a first electrical connector positioned in a channel in a front face of said first junction box mounting plate; and
    a second fixture mounting plate having electrical fixture mounting means for removably affixing said second electrical fixture mounting plate to said electrical fixture, and a second electrical connector positioned in a slot in a projection extending upwardly from a front face of the second fixture mounting plate;
    said channel in the front face of the first junction box mounting plate being sized to slidable receive the projection extending from the front face of the second electrical fixture mounting plate, and said first electrical connector being configured to mate with said second electrical connector; and wherein side walls of the channel in the front face of the first junction box mounting plate are angled inwardly to receive outwardly sloping walls of the projection on the second electrical fixture mounting plate.

2. The quick-connect mounting device according to claim 1 wherein said means for removably affixing said first junction box mounting plate to said junction box comprises a plurality of bore holes located at opposing corners of the junction box mounting plate and a plurality of bolts inserted through said bore holes and threadabtly engaging threaded bore holes in the junction box.

3. The quick connect mounting device according to claim 2 where said means for removably affixing said second electrical fixture mounting plate to said electrical fixture comprises a plurality of bore holes located at opposing corners of the electrical fixture mounting plate and a plurality of bolts inserted through said bore holes and threadabtly engaging threaded bore holes in the electrical fixture.

4. The quick-connect mounting device according to claim 1, further comprising a plurality of electrical wires passing through an opening in the first junction box mounting plate and having first ends connected to said first electrical connector and second ends coupled to power supply wires within the junction box.

5. The quick-connect mounting device according to claim 4, further comprising a plurality of electrical wires passing through an opening in the second electrical fixture mounting plate and having first ends connected to said second electrical connector and second ends coupled to electrical terminals of the electrical fixture.

6. The quick-connect mounting device according to claim 1, wherein the first electrical connector is a female connector and the second electrical connector is a male connector with male contacts configured to engage the female contacts of the first electrical connector when the first junction box mounting plate and second electrical fixture mounting plate are fully engaged.

7. The quick-connect mounting device according to claim 1 wherein the junction box is mounted in a ceiling of a structure.

\* \* \* \* \*